(12) United States Patent
Gai et al.

(10) Patent No.: US 9,651,151 B2
(45) Date of Patent: May 16, 2017

(54) DOUBLE-EFFECT HYDRAULIC ACTUATING CYLINDER

(71) Applicants: Marcella Gai, Genoa (IT); Enrico Pagani, Crocefieschi (IT); Alberto Fuccaro, Genoa (IT)

(72) Inventors: Marcella Gai, Genoa (IT); Enrico Pagani, Crocefieschi (IT); Alberto Fuccaro, Genoa (IT)

(73) Assignee: ULTRAFLEX S.P.A., Casella (IT)

( * ) Notice: Subject to any disclaimer, the term of this patent is extended or adjusted under 35 U.S.C. 154(b) by 294 days.

(21) Appl. No.: 14/485,399

(22) Filed: Sep. 12, 2014

(65) Prior Publication Data

US 2015/0075366 A1 Mar. 19, 2015

(30) Foreign Application Priority Data

Sep. 16, 2013 (IT) .............................. GE2013A0089

(51) Int. Cl.
*F16J 1/12* (2006.01)
*B63H 20/12* (2006.01)
*F15B 15/14* (2006.01)

(52) U.S. Cl.
CPC ............... *F16J 1/12* (2013.01); *B63H 20/12* (2013.01); *F15B 15/1428* (2013.01); *F15B 15/1433* (2013.01); *F15B 15/1442* (2013.01); *F15B 15/1461* (2013.01); *F15B 2211/7054* (2013.01)

(58) Field of Classification Search
CPC ..................................... F16J 1/12; B63H 20/12
USPC ............................................................. 92/61
See application file for complete search history.

(56) References Cited

U.S. PATENT DOCUMENTS

| 4,731,035 A * | 3/1988 | Wagner | B63H 21/265 114/144 R |
| 4,773,882 A * | 9/1988 | Rump | B63H 21/265 440/61 R |
| 5,002,510 A * | 3/1991 | Rump | B63H 20/12 440/53 |
| 5,092,801 A * | 3/1992 | McBeth | B63H 21/265 114/144 R |
| 5,471,909 A * | 12/1995 | Kobelt | F15B 15/1438 92/161 |
| 5,513,556 A * | 5/1996 | Schaefer | F16J 15/18 277/512 |

FOREIGN PATENT DOCUMENTS

JP H0525066 4/1993

* cited by examiner

*Primary Examiner* — Thomas E Lazo
(74) *Attorney, Agent, or Firm* — Themis Law

(57) ABSTRACT

A double-effect hydraulic actuating cylinder, particularly for hydraulic steering devices and for marine outboard motors, includes a cylinder slidably fitted on a coaxial rod, or vice versa, which sealingly projects out a head of the cylinder and carries a separating piston dividing the cylinder into two variable volume chambers, each connected to one of two inlets/outlets of the pump and a sealing head for the mutual sliding of cylinder and rod. The rod is non-slidably connected to a bracket fastening the cylinder to the motor, and an idler arm is secured to the motor and integral with the cylinder. At least one of the sealing heads include a sealing element engaging the inner side walls of one of the two variable-volume chambers, and a separate, coaxial plug element placed at the end parts of the cylinder and preventing the sealing element from sliding.

12 Claims, 11 Drawing Sheets

DOUBLE-EFFECT HYDRAULIC ACTUATING CYLINDER

FIELD OF THE INVENTION

The present invention relates to a double-effect hydraulic actuating cylinder, particularly for hydraulic steering devices in particular for marine outboard motors.

Generally outboard motors comprise an end fastening to the transom of a watercraft on which the motor is mounted so as to rotate about a substantially vertical steering axis.

The steering device comprises a closed hydraulic circuit with at least one pump driven by steering means, such as a steering wheel, a helm or the like, while the cylinder is slidably fitted on at least one rod coaxial to it, or vice versa, sealingly projecting out of at least one head of the actuating cylinder and it carries a separating piston which divides the cylinder into two variable-volume chambers.

Each of the two chambers has at least one hydraulic fluid inlet/outlet, each one being connected to one of two inlets/outlets of the pump and a sealing head for the mutually sliding cylinder and rod, integral with the cylinder.

Moreover the rod is connected to one bracket for fastening the cylinder to the motor, in a non slidable manner and such to allow the relative rotation of the motor with respect to the transom according to an axis parallel to the axis of the rod.

Finally there is provided an idler arm secured to the motor and integral with the cylinder, for steering the motor.

BACKGROUND OF THE INVENTION

Double-acting hydraulic actuators are known in the prior art and are widely used. Typical examples of such actuators are described in the document EP 1488996 to the same applicant.

The present invention is directed to hydraulic cylinders, regardless of their specific arrangement, whether unbalanced cylinders or of any other type known in the prior art.

The different components of actuating cylinders known in the prior art are widely spread and tested, in order to optimize operation of the cylinders.

Although these devices accomplish their function in a satisfactory manner, they have a number of drawbacks.

One of the most widespread drawbacks is the difficulty in assembling both the cylinder on the watercraft, and the individual cylinder components that have to be assembled together.

The assembling is a matter that only experts can accomplish, therefore, even in emergency cases or damage cases, a common user is hardly able to act on the cylinder.

Moreover, the parts of prior art known cylinders that is most subjected to wear is the head, since it is the component most subjected to mechanical stresses.

The head has to slide on the rod while guaranteeing the seal of the fluid flowing in the steering devices. Therefore the head, subject to a number of fatigue cycles, tends to wear and this inevitably causes the fluid to leak from the chambers of the cylinder to the outside.

Since such undesired condition creates a malfunction, the head is the component that is replaced most often, even if the replacement regards only a part thereof or even the gaskets that have been damaged.

This further leads to drawbacks from the economic standpoint, since it requires an excessively high expense for the operator, he/she being forced to change the entire head even if a very small part of it is damaged.

Therefore, there is the unsatisfied need in the prior art to provide a double-acting hydraulic actuating cylinder, for hydraulic steering devices, particularly for marine outboard motors, that can be easily mounted on the watercraft and that has components that can be easily replaced, improving the performance and cost-related characteristics.

SUMMARY OF THE INVENTION

The present invention achieves the above objects by providing an actuating cylinder, as described hereinbefore, wherein at least one of the sealing heads is composed of two separated elements, a sealing element and a plug element.

The sealing element is sealingly fitted into one of two variable-volume chambers, such to engage the inner side walls thereof.

Moreover, the plug element is placed at the end parts of the cylinder, such to prevent the sealing element from sliding, the sealing element and the plug element being coaxial with respect to the rod.

A cylinder according to the present invention modifies the arrangement of the heads by dividing them in two independent and separately replaceable parts.

Therefore, unlike cylinders known in the prior art, the present invention provides for the part that is most subjected to wear to be easily replaced, that is, the sealing element, without the need of completely replacing the head, in case of malfunctions of the cylinder or in case of seal losses.

Moreover, dividing the head in two parts, in addition to advantages from the economic standpoint, provides for the parts to be assembled and disassembled more easily in order to facilitate maintenance and replacement of the components.

In particular, the easier assembly and replacements of the components will be clearly understood through the description of a few embodiments of a cylinder according to the present invention.

Preferably, the sealing element sealingly engages the inner walls of the variable-volume chamber, inside which it is inserted with the support of gaskets.

Moreover, advantageously both the sealing heads are composed of two separated elements as described above.

As it will be seen below, the plug element is secured to the cylinder, but unlike prior art devices, the sealing effect of the head is independent from the tightening force of the plug element and is obtained only by means of the sealing element.

Thus, the system is made more secure, since even an unskilled user can easily disassemble the cylinder head for replacing the gaskets of the sealing element and even in case of a wrong assembly of the plug element, the cylinder works properly, that is, the sealing effect is guaranteed.

Therefore, the inventive concept of the cylinder of the present invention involves dividing the head in two elements. The embodiments and the related advantages that are described below are directed to improving the assembly of each individual component in the cylinder and the installation of the cylinder on the motor, optimizing its performance.

Preferably the sealing element and the plug element are composed of a tubular body.

In particular, the external surface of the sealing element has a groove placed at one end of the tubular body, such that with the sealing element in the condition inserted into the chamber, the groove communicates with the hydraulic fluid inlet/outlet of the cylinder.

This feature is particularly advantageous since it creates an area on the sealing element where the fluid can be conveyed with the cylinder in the end-of-stroke condition, that is, when the variable-volume chamber is in the minimum volume condition.

Thus, the stroke of the cylinder can use all the length of the variable-volume chamber till abutting against the sealing element, without the need of leaving a space where the flowing fluid is housed, which instead is contained in the volume delimited by the groove.

Preferably the sealing element is housed for a part into the two chambers, that part having seats for housing gaskets, while the remaining part has a radial enlargement intended to cooperate by a form fit with the inner walls of the plug element.

Advantageously, the plug element is fastened to the cylinder body by any manner known in the prior art, such as for example screw or bayonet fastening systems.

Preferably, threaded pins are used, which are inserted axially into the cylinder body and the plug element.

Such pins engage tightening nuts, the plug element having through holes for inserting the pins.

This method for fastening the plug element to the cylinder allows opening and closing the variable-volume chambers of the cylinder without the risk of damaging the components that are present therein, in particular without causing further mechanical stresses on the sealing element.

Preferably, the plug element is composed of a tubular body with a cylindrical symmetry.

As it will be seen from the below described embodiments, cylindrical symmetry is obtained also with respect to a plane perpendicular to the longitudinal axis of the cylinder.

The symmetry of the plug element plays an important and particularly advantageous role, since it allows producing a plug element of only one type, which perfectly matches both the right head and the left head of a cylinder according to the present invention.

This feature clearly provides advantages both from the production and the economic standpoint.

This aspect is even more advantageous in combination with one embodiment of a cylinder according to the present invention, in which the idler arm of the motor is connected to the plug element.

In particularly, the arm may be connected to the plug element through an appendage extending from the external surface of the plug element.

Therefore, advantageously, the position of the arm can be easily moved from the right to the left, and vice-versa by simply removing the plug element.

Moreover, in another embodiment the appendage is made as one piece with the plug element.

In a variant embodiment, the fastening bracket is composed of a bar placed with its own longitudinal axis parallel to the longitudinal axis of the rod and connected thereto through two end elements.

The bar is composed of two parts, of which a first part and a second part are connectable to each other.

Even this feature facilitates the assembly of the cylinder, particularly the fastening to the motor.

The bar divided into two parts allows fitting the two parts in the motor tube of the motor, by inserting them one by one, while, if it were a single piece, there would be problems related to the encumbrance with the transom of the watercraft.

Preferably, the first part has a reduced section end providing a through hole, which end is inserted in the second part, such that, in the engaged condition, the through hole coincides with a corresponding through hole provided in the second part.

There is further provided a peg inserted transversely to avoid the relative movement between the first part and the second part.

This arrangement optimizes the tightening between the first and the second part, preventing them from being uncoupled by mechanical stresses due to the rotation of the motor.

In another embodiment, the ends of the bar are inserted into corresponding housing seats provided in said end elements.

Abutment bushings may be provided, mounted coaxially to said bar and placed at said end elements.

The abutment bushings allow a discharge of the stresses acting on the bar, since they abut against the end elements, limiting the oscillation of the bar about its own longitudinal axis.

Thus, deformations of the housing seat are avoided and consequently a proper operation of the cylinder is provided, since the motor is free to regularly rotate about an axis parallel to the rod, without the presence of undesired oscillation movements.

The ends of the bar engage in the seats preferably with a threading, therefore, the just described feature is particularly advantageous because the section of the bar is reduced.

A reduced section causes a reduced support of the bar in the housing seat and the mechanical stresses created by the motor in motion may damage the threading and, therefore, the engagement of the bar in the seat, creating slacks or losses that can lead to malfunctions of the cylinder.

Likewise, even the rod is inserted into housing seats provided in the end elements, preferably by means of bushings intended to limit the rod wear.

Due to the advantageous characteristic of assembling the cylinder heads regardless of the position on the right or on the left, the present invention relates also to a cylinder, wherein at least one of the sealing heads is composed of a body at least partially symmetric with respect to a plane perpendicular to the axis of the cylinder.

The symmetry allows a single design of the sealing head to be made, which can be assembled both at one side and at the other side of the cylinder body.

Preferably, the symmetric part relates to the sealing part of the head, that is, the part inserted into the cylinder chamber.

In one embodiment, the symmetric body intended to be the sealing head has a plug element interposed between at least two sealing elements, at least one of the two sealing elements being sealingly inserted into one of the two variable-volume chambers, the sealing element engaging the inner side walls of the chamber.

The plug element may be placed at the end parts of the cylinder.

Advantageously, a cylinder according to the invention can be made according to one or more of the above described features.

BRIEF DESCRIPTION OF THE DRAWINGS

These and other characteristics and advantages of the present invention will be clearer from the following description of a few embodiments shown in the enclosed drawings, wherein.

It is set forth that the present figures illustrate preferred embodiments of a cylinder according to present invention is shown, but those figures are to be considered merely exemplary for a better understanding the concepts and advantages of the present invention.

Those figures are not to be intended as limiting the breadth or scope of the claimed invention, namely, a double-effect actuating cylinder having heads that re easily disassembled and replaced.

DETAILED DESCRIPTION OF EMBODIMENTS OF THE INVENTION

Figure 1A:
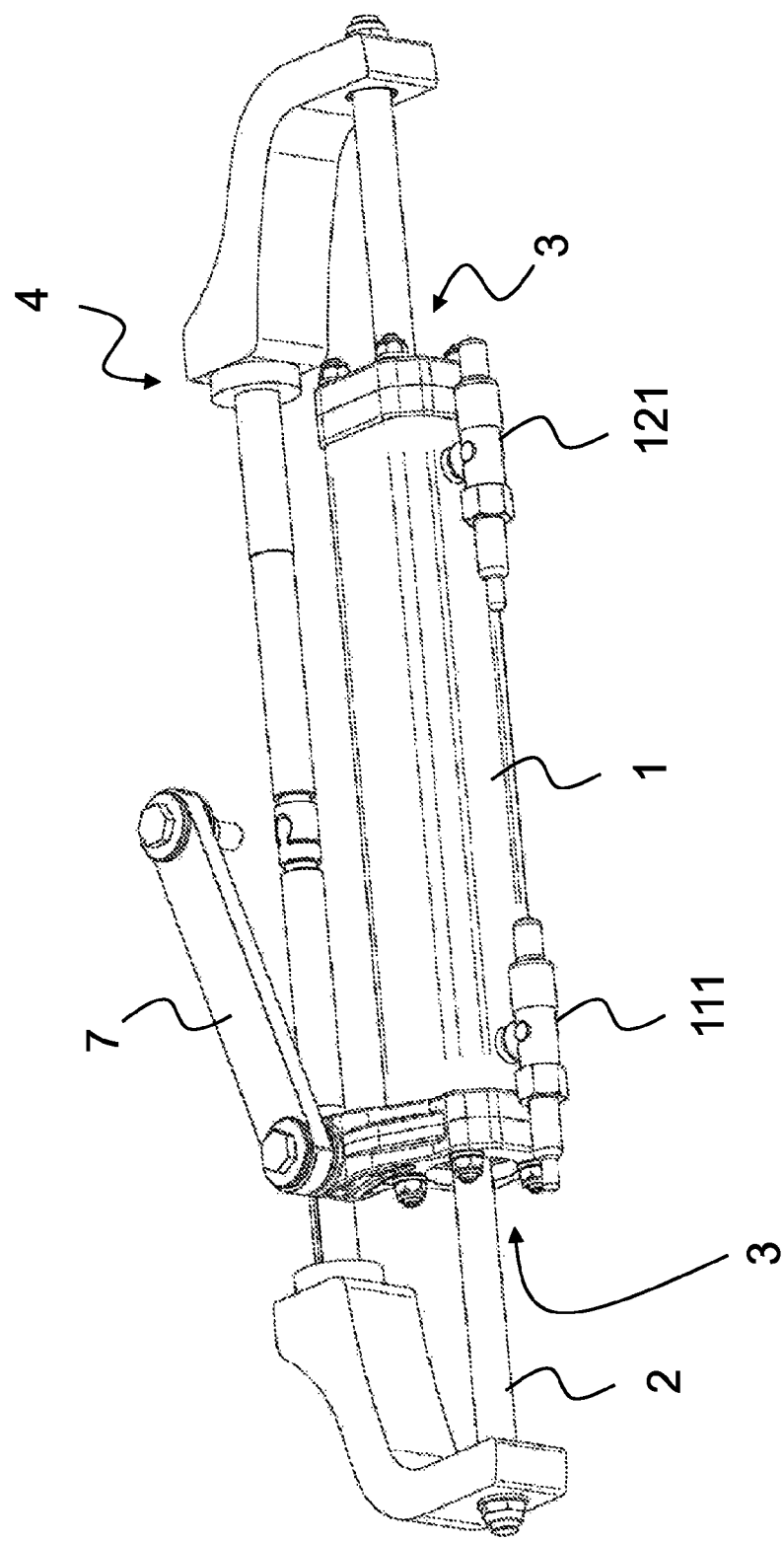
FIG. 1a is a perspective view of an actuating cylinder according to the present invention.
Figure 1B:
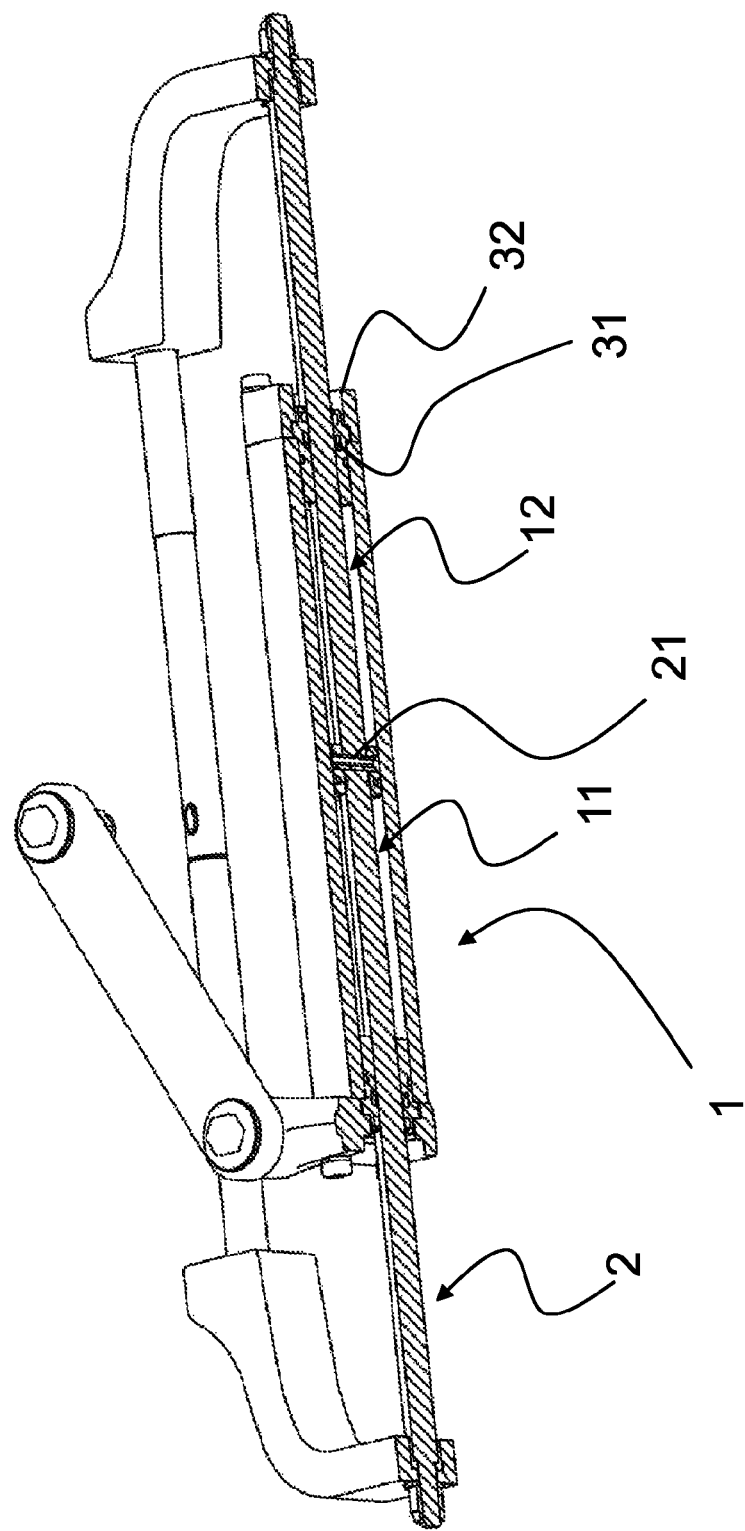
FIG. 1b is a section of a cylinder according to the present invention along a plane by the longitudinal axis of the cylinder.
Figure 2B:
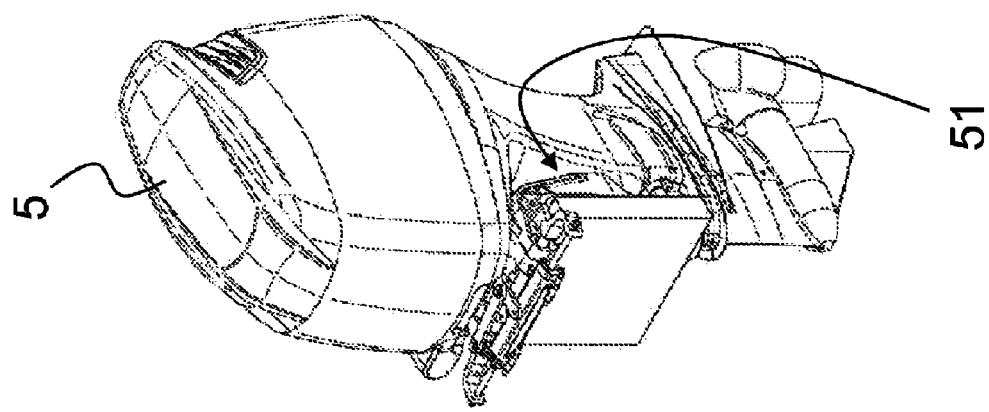
FIGS. 2a and 2b show the installation of a cylinder according to the present invention in a steering device for marine motors.

With reference to FIGS. 1a and 2b, there is shown a double-acting hydraulic actuating cylinder 1 for hydraulic steering devices, in particular for outboard marine motors.

Outboard motor 5 comprises an end fastening to the watercraft transom, on which the motor 5 is fitted so as to rotate about a substantially vertical steering axis.

Moreover, the steering device comprises a closed hydraulic circuit 8 with at least one pump 9 operated by steering means, such as a wheel, a helm or the like.

Moreover, the cylinder 1 is mounted so as to slide on at least one rod 2 coaxial to the cylinder 1, sealingly projecting out from at least one head of the actuating cylinder 1, and carries a separating piston 21 that divides the cylinder into two variable-volume chambers 11, 12.

Each one of the two chambers 11, 12 has an inlet/outlet 111, 121 for the hydraulic fluid, each connected to one of two inlets/outlets of the pump 9 and a sealing head 3 for the mutually sliding cylinder 1 and rod 2. The sealing head 3 is integral with the cylinder.

The rod 2 is connected to a bracket 4 fastening the cylinder 1 to the motor 5, in a manner such not to slide and to allow the motor 5 to perform a relative rotation with respect to the transom according to an axis parallel to the axis of the rod 2.

Figure 2A:
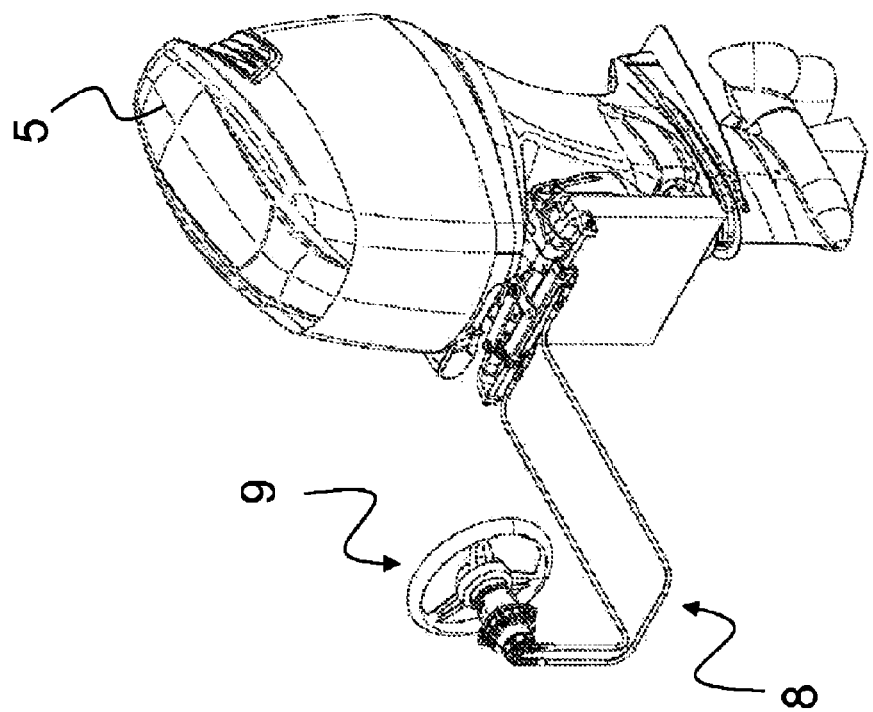

With reference to FIGS. 2a and 2b, the cylinder 1 is inserted at least partially into a corresponding insertion seat 51 belonging to the motor 5, such that the motor can perform a rotation according to the direction defined by the arrow A.

Moreover, there is provided an idler arm 7 fastened to the motor 5 and integral with the cylinder 1 for steering the motor 5.

As in prior art devices, the translation of the cylinder 1 along the rod 2 allows a rotation of the motor 5 about a vertical axis by the provision of the arm 7, which transmits the movement of the cylinder 1 to the motor 5.

In a cylinder according to the present invention, the sealing heads 3 are composed of two elements, which include a sealing element 31 and a plug element 32.

The sealing element 31 is sealingly inserted into the two variable-volume chambers 11, 12 and engages the inner side walls of the two chambers 11, 12.

Preferably, the sealing element engages the inner side walls of the two chambers 11 and 12 through the provision of gaskets 311.

Moreover, the plug element 32 is placed at the end parts of the cylinder 1, such to prevent the sealing element 31 from sliding, the sealing element 31 and the plug element 32 being coaxial to the rod 2.

Figure 3:
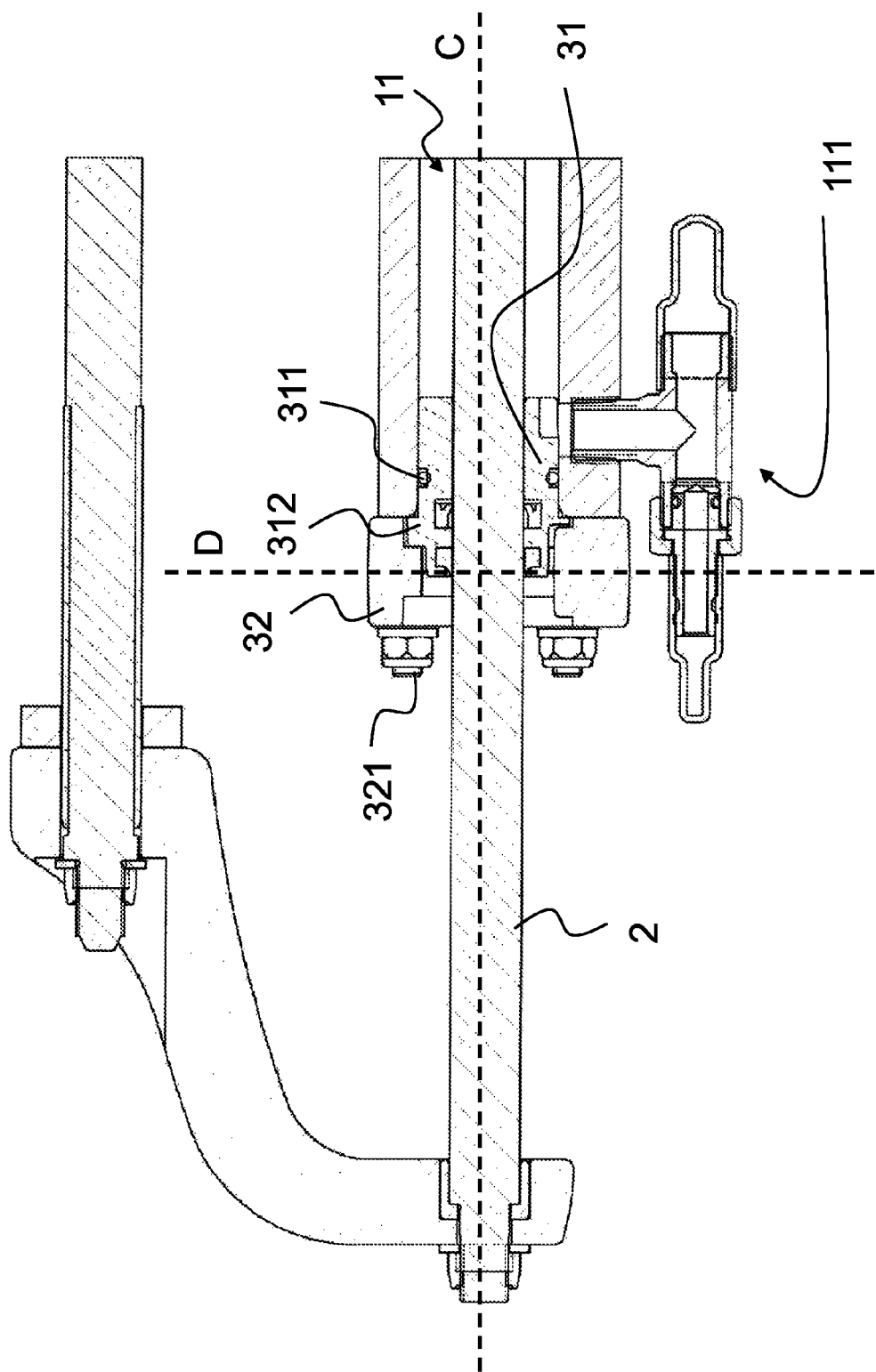
FIG. 3 shows a detail of a cylinder according to present invention.

FIG. 3 shows a detail of the above described head, particularly of the left head, but the same comments also apply to the right head.

In the described variant, the sealing element 3 generates the seal by means of a radial action of the inner walls of the cylinder 1 on the outer walls of the sealing element 31, particularly on the gaskets 311.

Therefore, the plug element 32 generates an action that merely axially retains the sealing element 31, in order to oppose the axial thrust of the fluid flowing within the circuit.

Moreover, FIG. 3 shows the sealing element 31 and the plug element 32 composed of a tubular body.

The sealing element 31 is housed for a part into the chamber 11, and that part has seats housing the gaskets 311, while the remaining part has a radial enlargement 312 intended to cooperate by a form fit with the inner walls of the plug element 32.

The form fit of the sealing element 31 with the plug element 32 helps in increasing the fastening of both elements in place, once the plug element 32 is fastened to the cylinder 1.

In one embodiment, the sealing element 31 may be made of a plastic material, while the plug element 32 may be made of a metallic material.

Figure 4A:
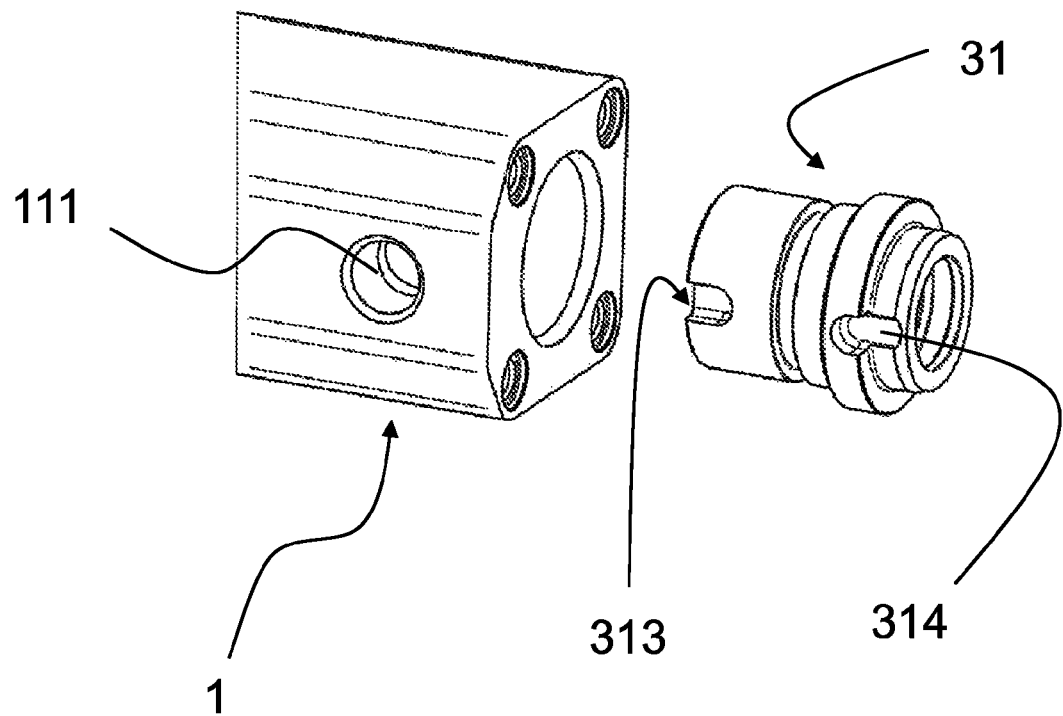
FIGS. 4a and 4b depict an embodiment of the sealing element belonging to a cylinder according to present invention.
Figure 4B:
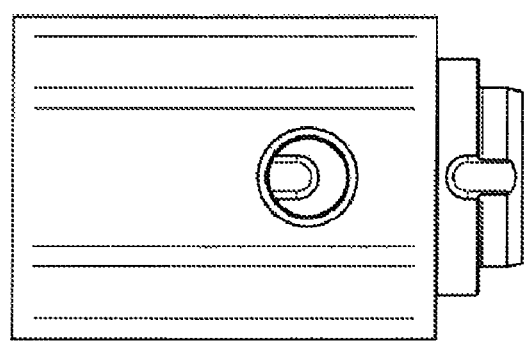

FIGS. 4a and 4b show an embodiment of the sealing element 31, in which the outer surface of the sealing element 31 has a groove 313 placed at one end of the tubular body, such that when the sealing element 31 is in the condition inserted into the chamber 11 (see FIG. 4b), the groove 313 communicates with the hydraulic fluid inlet/outlet 111, 121 of the cylinder 1.

FIG. 4a shows a view of the sealing element 31 aligned with the body of the cylinder 1 and also shows how the groove 313 coincides with the hole 115 provided for the fluid inlet/outlet in the insertion direction.

Thus, a fluid housing area is created, which allows, such as described above, an abutment of the separating piston 21 against the end side of the sealing element 31 with the variable-volume chamber 11, 12 in the minimum volume conditions.

FIG. 4a further shows a second groove 314 that can cooperate with a corresponding engagement tooth provided on the inner surface of the plug element 32.

The coupling of the engagement tooth with the groove 314 allows the components of a cylinder according to the present invention to be assembled more easily.

Figure 5:
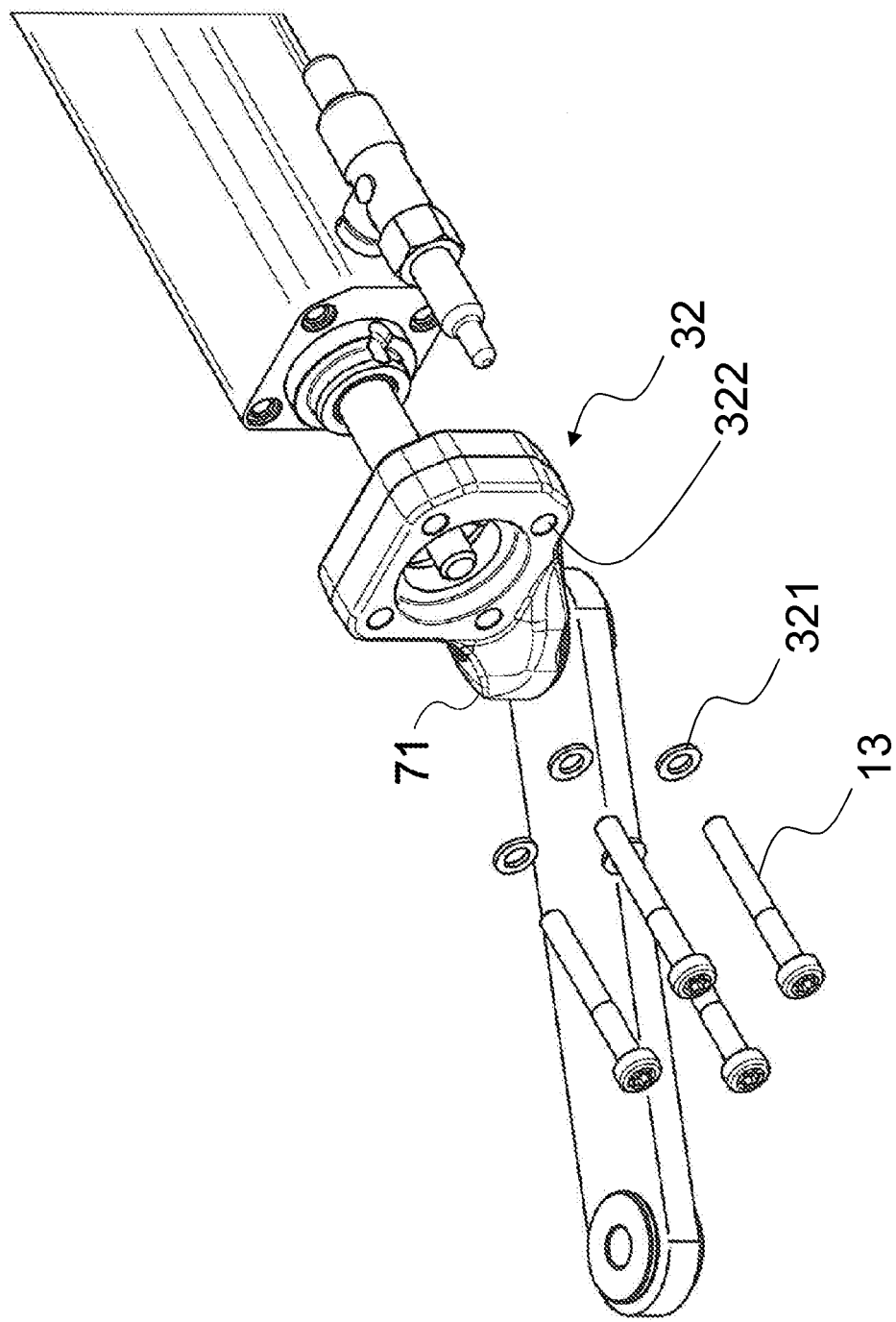
FIG. 5 shows the assembly of the head of a cylinder according to present invention.

Preferably (see FIG. 5), the plug element 32 is fastened to the cylinder 1 by threaded pins 13 inserted axially to the body of the cylinder 1 and the plug element 32, engaging tightening nuts 321.

The plug element has through holes 322 for the insertion of the pins 13.

Preferably, as shown in the figures, the plug element 32 is composed of a tubular body with a cylindrical symmetry.

As can be clearly seen in the figures, the symmetry relates above all to a plane perpendicular to the longitudinal axis of the cylinder 1.

Moreover, the idler arm 7 is connected to the plug element 32 by an appendage 71 extending from the external surface of the plug element 32.

The above described characteristics advantageously allow the idler arm 7 to be placed both on the right and on the left of the cylinder 1.

With particular reference to FIGS. 1a to 6, the arm 7 is mounted in a left position with respect to the cylinder 1.

In order to pass from the position on the left to the position on the right, it is possible to remove the plug element 32 and to rotate it by 180° about the longitudinal axis of the cylinder.

The symmetric arrangement of the plug element 32 provides for plug element 32 to be mounted rotated by 180° without having to make changes to the cylinder 1.

Figure 6:
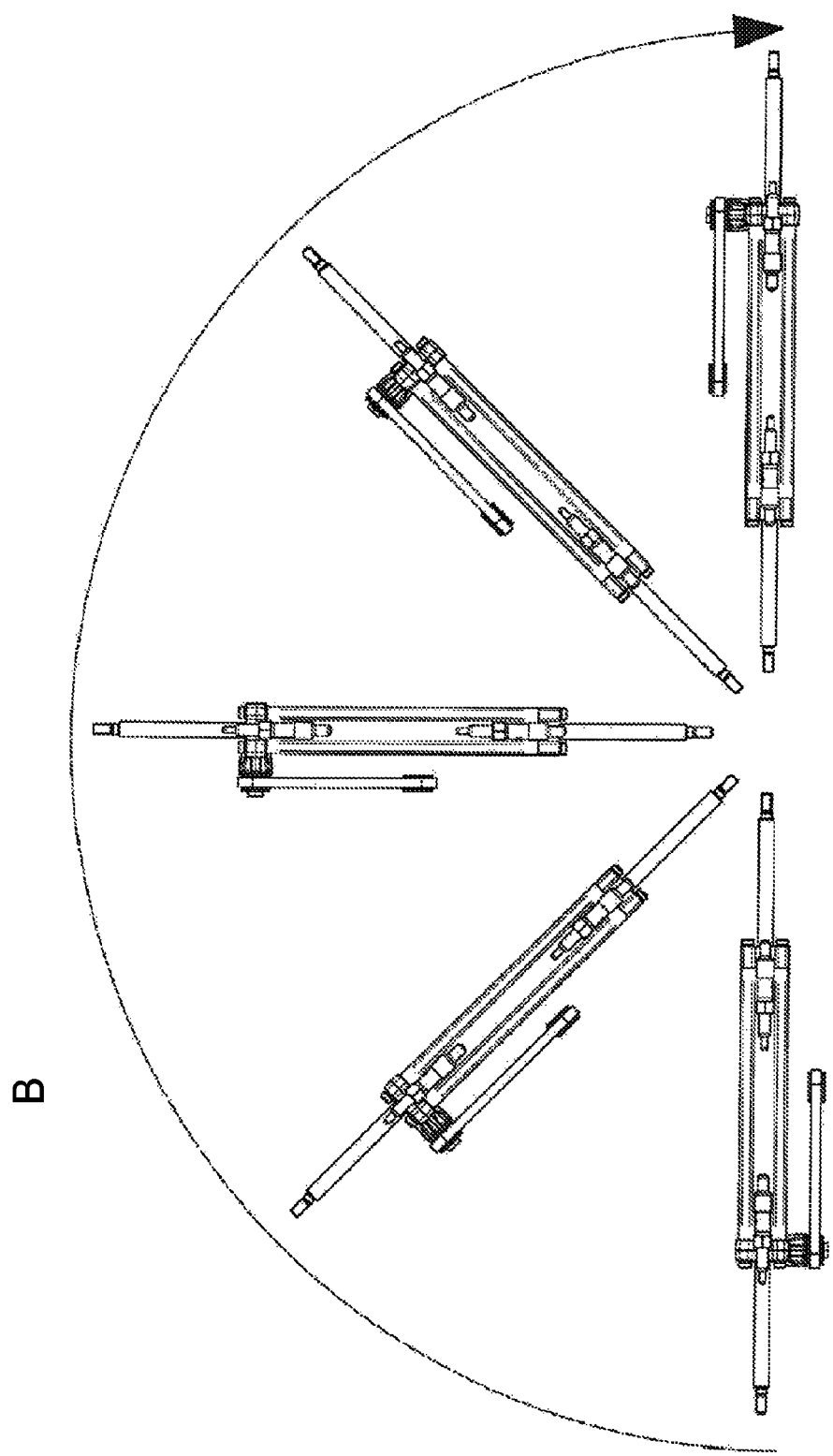
FIG. 6 shows a cylinder according to present invention in one embodiment.

Now the arm 7 is in a position underneath the cylinder 1 and by overturning it in the direction of the arrow B of FIG. 6, it is possible to pass from the position of the arm 7 on the left to the position on the right with respect to the cylinder 1.

With particular reference to FIG. 3, it can be seen that making the plug element 32 as a tubular body with a cylindrical symmetry means that the plug element 32 is symmetrical both with respect to the axis C and the axis D, such that a single type of plug element 32 may be produced that can be adapted both in the position on the right and in the position on the left.

In one embodiment, the appendage 71 is made as one piece with the plug element 32.

With particular reference to FIGS. 7a to 8b, the fastening bracket is composed of a bar 41 placed with its own longitudinal axis parallel to the longitudinal axis of the rod 2 and connected thereto by means of two end elements 42.

The bar 41 (see FIGS. 7a and 7b) is composed of two parts, which include a first part 411 and a second part 412 connectable to each other.

Figure 7A:
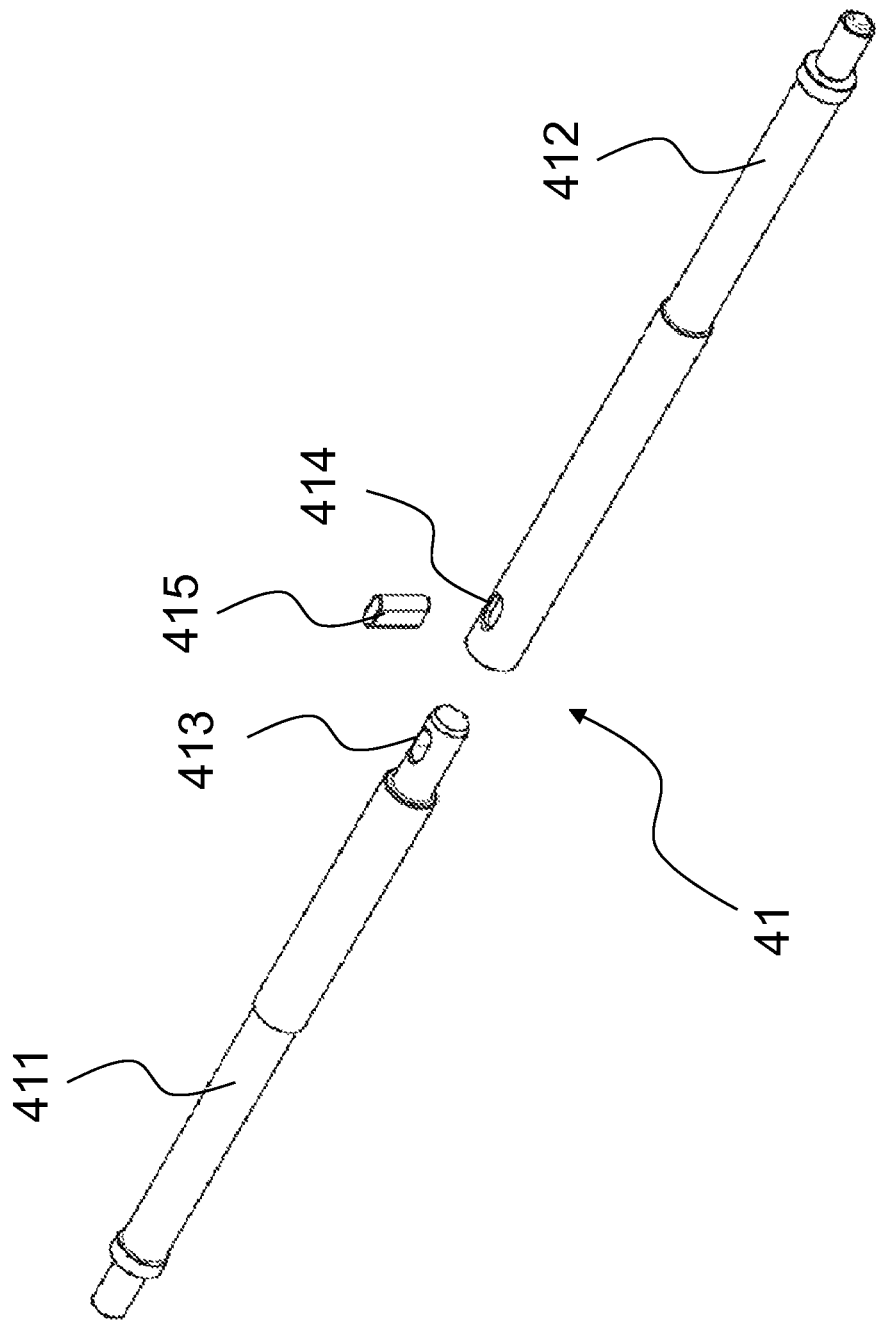
FIGS. 7a and 7b show two embodiments of the bar belonging to a cylinder according to the present invention.
Figure 7B:
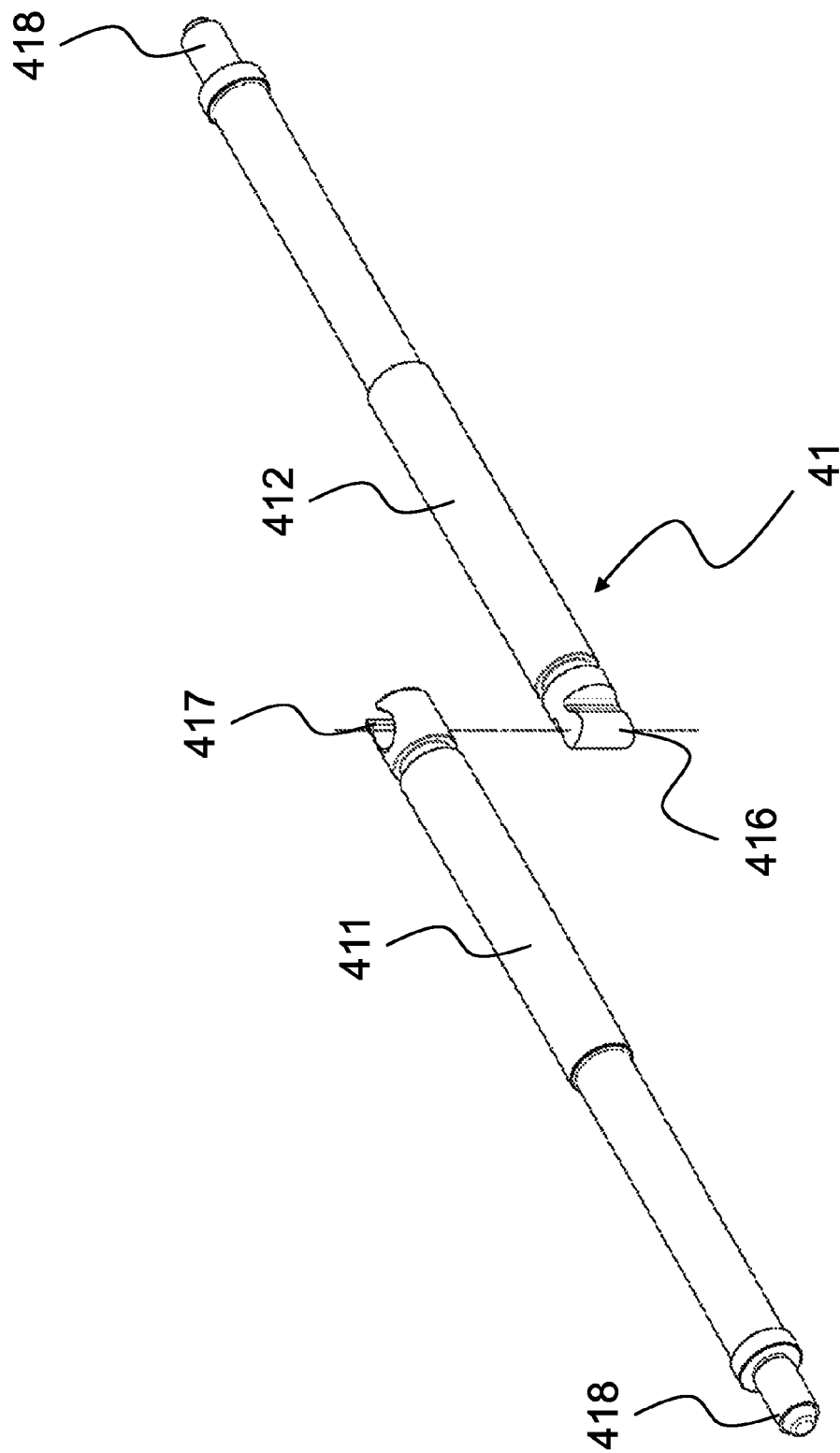

FIGS. 7a and 7b show two possible variant embodiments for making the bar 41.

In FIG. 7a the first part 411 has a reduced section end that provides a through hole 413. That end is inserted in the second part 412, such that, in the engagement condition, the through hole 413 coincides with a corresponding through hole 414 provided in the second part 412.

A peg 415 is inserted transversely to avoid a relative movement between the first part 411 and the second part 412.

Preferably, the holes 413 and 414 have an oval section, with the greatest dimension oriented in the direction of the longitudinal axis, such to provide a section of greater resistance.

As an alternative (see FIG. 7b), a form fit may be provided between the first part 411 and 412, for example a hooking end 416 composed of an enlarged head that cooperates with a corresponding hooking seat 417.

Preferably, the bar 41 has two ends 418 which are inserted into corresponding housing seats provided in the end elements 42.

Figure 8A:
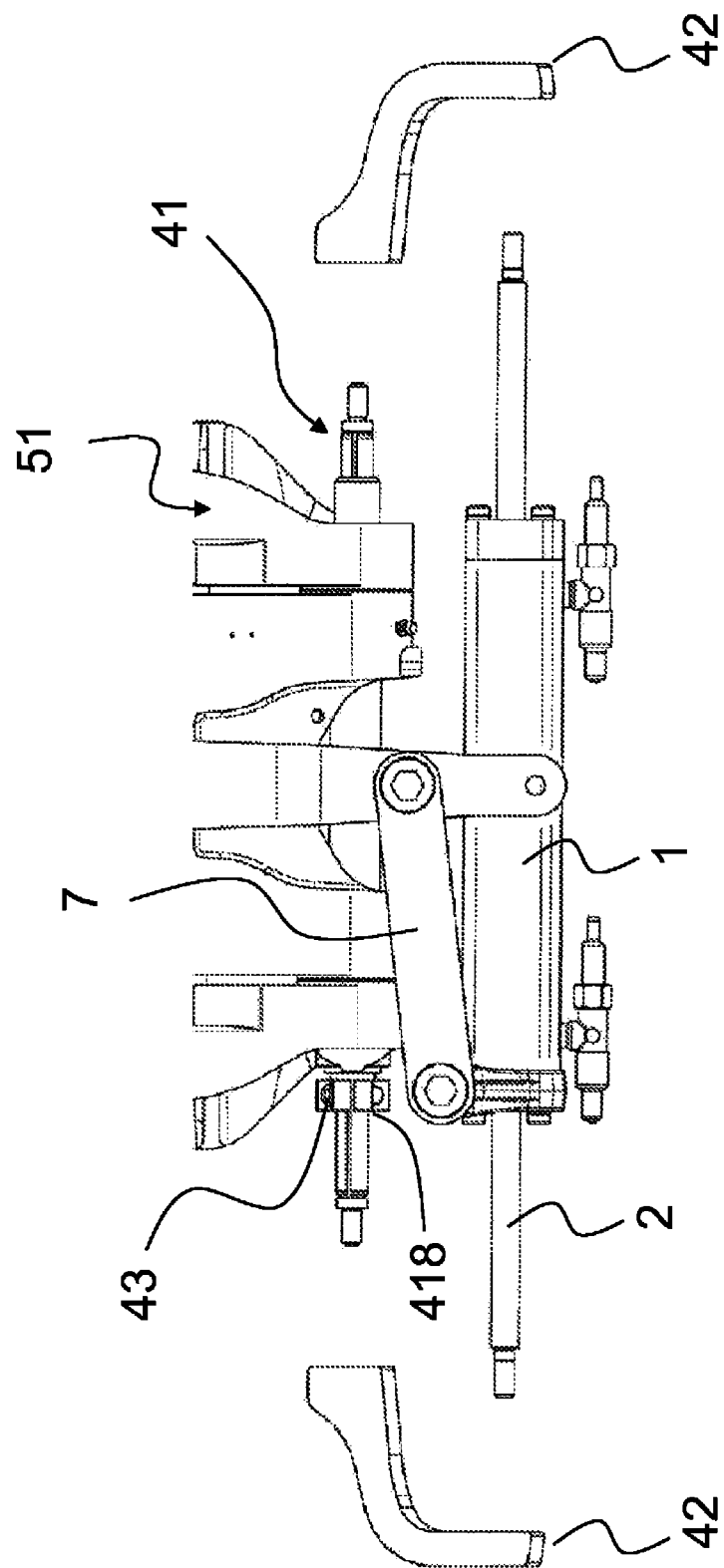
FIGS. 8a and 8b show an embodiment of a cylinder according to present invention.
Figure 8B:
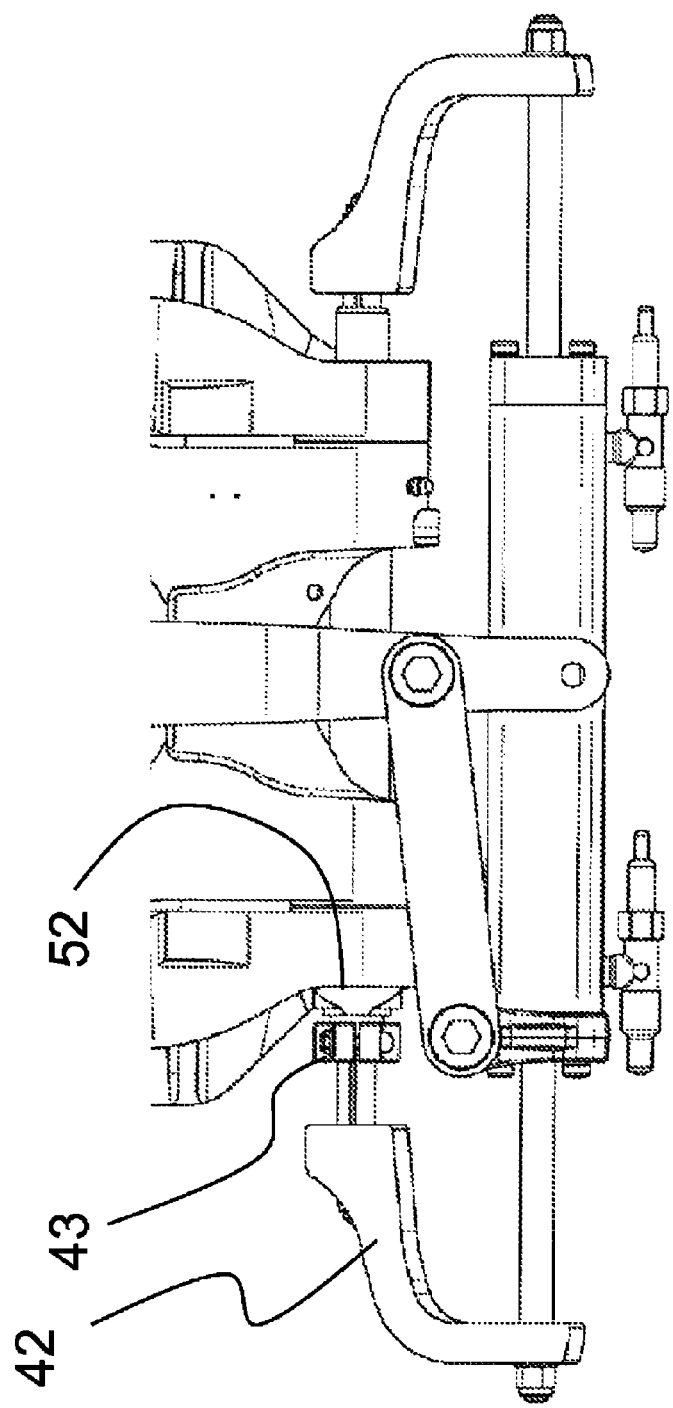

FIG. 8a shows an exploded view of the details of a cylinder according to the present invention. Both the rod 2 and the bar 41 have ends which must be inserted into corresponding housing seats provided in the end elements 42.

One or more abutment bushings 43 may be provided (see FIG. 8b), which are mounted coaxially with the bar 41 and are placed at the end elements 42.

The abutment bushings 43 are fitted on the threaded ends 418 of the bar 41 and abut against the wall 52 of the step joining the motor with the non threaded part of the bar 41, forming an enlarged abutment annular band.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A double-effect hydraulic actuating cylinder (1), particularly for a hydraulic steering device and for a marine outboard motor, the outboard motor (5) comprising an end configured for fastening to a transom of a watercraft on which the motor (5) is mounted such to rotate about a substantially vertical steering axis, the steering device comprising a closed hydraulic circuit with a pump driven by a steering device, the double-effect hydraulic actuating cylinder (1) comprising:

a cylinder (1) slidably fitted on a rod (2) coaxial with said cylinder (1), or vice versa, said rod (2) sealingly projecting out of at least one head of the cylinder (1) and carrying a separating piston (21) that divides the cylinder into two variable volume chambers (11, 12), each of the two variable volume chambers (11, 12) having a fluid inlet and a fluid outlet connected to an inlet or an outlet of the pump and a sealing head (3) providing for a mutual sliding of the cylinder (1) and the rod (2), said sealing head (3) being integral with the cylinder, wherein said rod (2) is connected to a bracket (4) non-slidably fastening said cylinder (1) to said outboard motor, thereby allowing a relative rotation of the outboard motor (5) relative to the transom about an axis parallel to an axis of the rod (2); and an idler arm (7) secured to said outboard motor (5) and integral with said cylinder (1), said idler arm being configured to steer said outboard motor (5), wherein said sealing head (3) comprises two separate elements, which include a sealing element (31) and a plug element (32), wherein said sealing element (31) is sealingly fitted into one of said two variable volume chambers (11, 12) and engages an inner wall of said chamber (11, 12), wherein said plug element (32) is placed at end parts of said cylinder (1), thereby preventing said sealing element (31) from sliding, wherein said sealing element (31) and said plug element (32) are coaxial with said rod (2), and wherein said bracket (4) comprises a bar (41) having a longitudinal axis parallel to a longitudinal axis of said rod (2) and connected thereto through two end elements (42), and wherein said bar (41) comprises a first part (411) and a second part (412) connectable to each other.

2. The double-effect hydraulic actuating cylinder (1) according to claim 1, wherein said sealing element (31) and said plug element (32) comprise a tubular body.

3. The double-effect hydraulic actuating cylinder (1) according to claim 2, wherein an external surface of said sealing element (31) has a groove placed at an end of the tubular body, and wherein, when said sealing element (31) is inserted into said chamber (11, 12), said groove communicates with said fluid inlet and said fluid outlet of said cylinder (1).

4. The double-effect hydraulic actuating cylinder (1) according to claim 1, wherein said sealing element (31) has a first part housed for a part into said one of said two chambers (11, 12), said first part having a seat for housing a gasket (311) engaging the inner walls of said one of said two chambers (11, 12), and a second part having a radial enlargement (312) configured to cooperate by form fit with an inner wall of said plug element (32).

5. The double-effect hydraulic actuating cylinder (1) according to claim 1, wherein said plug element (32) comprises a tubular body having a cylindrical symmetry, said tubular body being fastened to said cylinder (1).

6. The double-effect hydraulic actuating cylinder (1) according to claim 1, wherein said idler arm (7) is connected to said plug element (32) through an appendage extending from an external surface of said plug element (32).

7. The double-effect hydraulic actuating cylinder (1) according to claim 6, wherein said appendage is constructed as one piece with said plug element (32).

8. The double-effect hydraulic actuating cylinder according to claim 1, wherein the ends of said bar (41) are inserted into corresponding housing seats provided in said end elements (42), further comprising abutment bushings (43) mounted coaxially to said bar (41) and placed at said end elements (42).

9. A double-effect hydraulic actuating cylinder (1), particularly for a hydraulic steering device and for a marine outboard motor, the outboard motor (5) comprising an end fastening to a transom of a watercraft on which the outboard motor (5) is mounted such to rotate about a substantially vertical steering axis, the steering device comprising a closed hydraulic circuit with a pump driven by a steering device, the double-effect hydraulic actuating cylinder (1) comprising:
  a cylinder (1) slidably fitted on a rod (2) coaxial with said cylinder (1), or vice versa, said rod (2) sealingly projecting out of at least one head of the cylinder (1) and carrying a separating piston (21) that divides the cylinder into two variable volume chambers (11, 12), each of the two variable volume chambers (11, 12) having a fluid inlet and a fluid outlet connected to an inlet or an outlet of the pump and a sealing head (3) providing for a mutual sliding of the cylinder (1) and the rod (2), said sealing head (3) being integral with the cylinder,
  wherein said rod (2) is connected to a bracket (4) non-slidably fastening said cylinder (1) to said outboard motor, thereby allowing a relative rotation of the outboard motor (5) relative to the transom about an axis parallel to an axis of the rod (2); and
  an idler arm (7) secured to said outboard motor (5) and integral with said cylinder (1), said idler arm being configured to steer said outboard motor (5),
  wherein said sealing head (3) comprises a body that is at least partially symmetric with respect to a plane perpendicular to an axis of the cylinder (1) and
  wherein said bracket (4) comprises a bar (41) having a longitudinal axis parallel to a longitudinal axis of said rod (2) and connected thereto through two end elements (42), and wherein said bar (41) comprises a first part (411) and a second part (412) connectable to each other.

10. The double-effect hydraulic actuating cylinder according to claim 9,
  wherein said body comprises a plug element (32) interposed between at least two sealing elements (31),
  wherein at least one of said two sealing elements (31) is sealingly inserted into one of said two variable volume chambers (11, 12), said sealing element (31) engaging an inner side wall of said chamber (11, 12), and
  wherein said plug element (32) is placed at an end part of said cylinder (1).

11. The double-effect hydraulic actuating cylinder according to claim 10, wherein said sealing elements (31) and said plug element (32) are coaxial with said rod (2).

12. The double-effect hydraulic actuating cylinder according to claim 9, wherein the ends of said bar (41) are inserted into corresponding housing seats provided in said end elements (42), further comprising abutment bushings (43) mounted coaxially to said bar (41) and placed at said end elements (42).

* * * * *